(12) United States Patent
Haimer

(10) Patent No.: US 7,111,410 B2
(45) Date of Patent: Sep. 26, 2006

(54) CENTERING DEVICE, IN PARTICULAR FOR A PROBE MEASURING DEVICE

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 10/537,867

(22) PCT Filed: Dec. 12, 2003

(86) PCT No.: PCT/EP03/14142

§ 371 (c)(1),
(2), (4) Date: Jun. 7, 2005

(87) PCT Pub. No.: WO2004/055470

PCT Pub. Date: Jul. 1, 2004

(65) Prior Publication Data
US 2006/0048402 A1   Mar. 9, 2006

(30) Foreign Application Priority Data
Dec. 13, 2002   (DE) .................... 102 58 448

(51) Int. Cl.
*G01B 5/20* (2006.01)
(52) U.S. Cl. ........................................ 33/559
(58) Field of Classification Search ............ 33/559, 33/556, 558, 561, 520, 644
See application file for complete search history.

(56) References Cited

U.S. PATENT DOCUMENTS

| | | | |
|---|---|---|---|
| 4,078,314 A | | 3/1978 | McMurtry |
| 4,510,693 A | * | 4/1985 | Cusack ......................... 33/561 |
| 4,930,957 A | * | 6/1990 | Priessnitz ..................... 409/234 |
| 5,040,931 A | * | 8/1991 | Spivey et al. ................. 33/559 |
| 5,357,684 A | * | 10/1994 | Lindner et al. ............... 33/559 |
| 5,365,673 A | * | 11/1994 | Haimer et al. ................ 33/559 |
| 7,024,786 B1 | * | 4/2006 | Haimer ......................... 33/556 |

FOREIGN PATENT DOCUMENTS

DE    23 56 030    5/1975

(Continued)

OTHER PUBLICATIONS

German Search Report dated Dec. 13, 2002.

*Primary Examiner*—Christopher W. Fulton
(74) *Attorney, Agent, or Firm*—Scott D. Wofsy; Edwards Angell Palmer & Dodge LLP

(57) ABSTRACT

A centering device, in particular for a tracer-type measuring instrument (1), is proposed. The centering device comprises an instrument carrier (3) defining an instrument axis (7), a carrying shank (41) defining a shank axis (43) and a centering holder (45) holding the instrument carrier (3), with the instrument axis (7) parallel to the shank axis (43), radially movably to the latter, but so as to be capable of being fixed to the carrying shank (41). The centering holder (45) is designed as a parallelogram guide with a parallelogram-link region (59), or a plurality of these regions, distributed about the shank axis (43) and the instrument axis (47) and extending along these axes (7, 43). Such a parallelogram guide may be integrally formed in one piece on the carrying shank (41) and/or on the instrument carrier (3), thus reducing the outlay in terms of production. Setscrews (69) distributed on the circumference of the parallelogram guide make it possible to adjust the shank axis (43) in relation to the instrument axis (7).

8 Claims, 1 Drawing Sheet

FOREIGN PATENT DOCUMENTS

Figure 1:
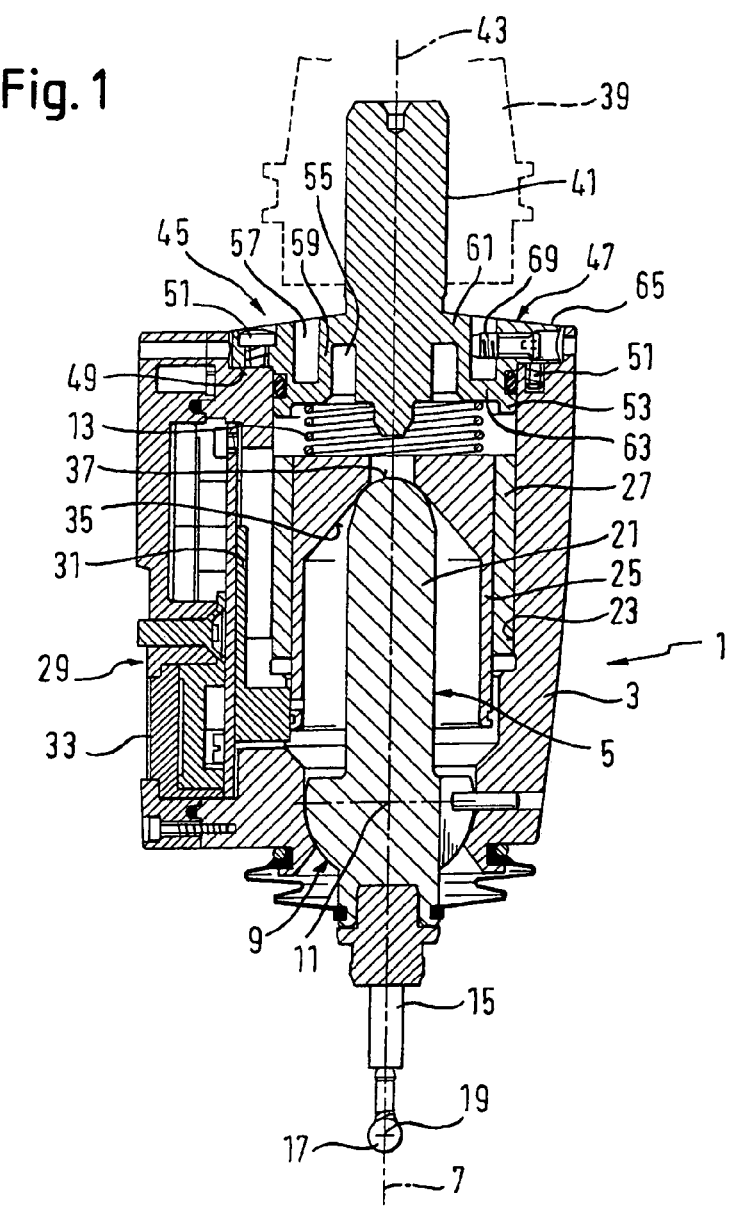

| | | |
|---|---|---|
| DE | 146 333 | 2/1981 |
| DE | 37 25 205 A1 | 2/1989 |
| DE | 37 25 207 A1 | 2/1989 |
| DE | 41 00 323 A1 | 7/1992 |
| DE | 43 31 655 C2 | 4/1995 |
| DE | 195 00 451 A1 | 7/1995 |
| DE | 195 02 840 A1 | 8/1996 |
| DE | 196 47 514 C2 | 5/1998 |
| DE | 100 14 630 A1 | 9/2001 |

\* cited by examiner

CENTERING DEVICE, IN PARTICULAR FOR A PROBE MEASURING DEVICE

The invention relates to a centering device, in particular for a tracer-type measuring instrument.

For example, the German laid-open publications DE-A-41 00 323, DE-A-195 02 840 and DE-A-100 14 630 disclose multicoordinate tracer-type measuring instruments, the tracing arm of which is displaceable in the direction of a main coordinate axis defined by guides of a housing and can be deflected transversely to this main coordinate axis by means of a universal joint. The housing is held on a carrying shank, the shank axis of which runs coaxially to the main coordinate axis in the state of use. So that the main coordinate axis of the housing can be centered in relation to the shank axis, the housing is provided, facing the carrying shank, with an axially perpendicular guide surface for the carrying shank and engages with a pin into a clearance of the carrying shank, said clearance allowing radial play between the carrying shank and the pin. The housing is consequently moveable axially parallel to the carrying shank and can be centered with the aid of a plurality of setscrews held on the carrying shank and capable of being advanced toward the pin. For fixing, an axial tension screw is provided, which screws the carrying shank to the housing. However, such a centering device formed by the carrying shank of the housing necessitates a comparatively high outlay in production terms, particularly because of the guide surfaces and locking means used there.

The object of the invention is to specify a centering device which is suitable, in particular, for a tracer-type measuring instrument and which can be produced more simply than hitherto.

The invention proceeds from a centering device, in particular for a tracer-type measuring instrument, which comprises:
An instrument carrier defining an instrument axis,
A carrying shank defining a shank axis,
A centering holder holding the instrument carrier, with the instrument axis parallel to the shank axis, moveably radially in relation to the latter, but so as to be capable of being fixed to the carrying shank,
and is characterized in that the centering holder is designed as a parallelogram guide with a parallelogram-link region distributed about the shank axis and the instrument axis and extending along these axes.

Such a centering holder manages without axially perpendicular guide surfaces and can therefore be produced substantially more simply and therefore more cost-effectively than in the case of conventional centering devices. Even though the centering device according to the invention is preferably used in a tracer-type measuring instrument, such as are described, for example, in the German laid-open publications DE-A-41 00 323, DE-A-195 02 840 or DE-A-100 14 630, such a centering device can also be employed advantageously in other fields of use. For example, the centering device may be an integral part of a tool holder which holds a rotary tool, such as, for example, a drill, milling cutter or the like, centrically to the axis of rotation of the spindle of a machine tool. This applies particularly to those tool holders which hold the rotary tool in a manner in which the latter is shrunk into a sleeve portion thermally expandable, for example, by means of inductive heating. Such tool holders have, for connection to the machine tool spindle, a standard coupling, for example in the form of a steep-angle taper or the like. In this case, the centering device according to the invention is arranged in the force transmission path between the standard coupling of the tool holder and the sleeve portion holding the rotary tool. In such a case, the carrying shank of the centering device according to the invention is designed as a standard coupling and the instrument carrier as a sleeve portion.

The parallelogram-link regions may be a multiplicity of links, for example in the form of bars, which are separate from one another and are arranged about the carrying or instrument axis and which can be deflected on all sides, especially when these parallelogram-link regions are arranged in the manner of a segmented axially parallel circular-cylindrical sleeve portion. However, an embodiment in which the sleeve portion is designed with a closed wall in the circumferential direction can be adjusted more accurately and can also be produced more simply.

In a preferred embodiment, the centering holder has a connecting flange which surrounds the shank axis and the instrument axis and connects the carrying shank to the instrument carrier and which has on its sides facing axially away from one another circular grooves which are concentric to one another, overlap one another axially and delimit the sleeve portion radially between them. Such grooves can easily be worked into the connecting flange and, by their axial depth and the radial distance between them, determine the radial deflection properties of the sleeve portion. The annular regions of the connecting flange which project radially inward and radially outward beyond the grooves also stiffen the centering holder, so that the parallelogram movement is essentially based solely on the deformation of the sleeve portion. Both in embodiments in which the parallelogram-link regions are formed from individual bars and in embodiments with parallelogram-link regions designed as a closed sleeve portion, there is preferably provision for the at least one parallelogram-link region to be connected at its one axial end to a first annular portion of the centering holder and at its other axial end to a second annular portion of the centering holder, and for one of these annular portions to carry at least one, but preferably at least three, setscrews which are distributed in the circumferential direction and are supported radially in the region of the other of these annular portions. The common portions stiffen the axial ends of the parallelogram-link regions in relation to one another, the setscrews which are supported between the two annular portions ensuring a uniform deflection of the link region. Expediently, the two annular portions are arranged coaxially one in the other, the outer annular portion carrying the setscrews in a radially screwable manner. This makes it easier to adjust the setscrews.

The centering holder may be a component which is separate from the carrying shank and from the housing. In a preferred variant which simplifies production, however, the parallelogram-link region is produced with its axial ends integrally in one piece with a carrying shank and/or with the instrument carrier.

Figure 2:
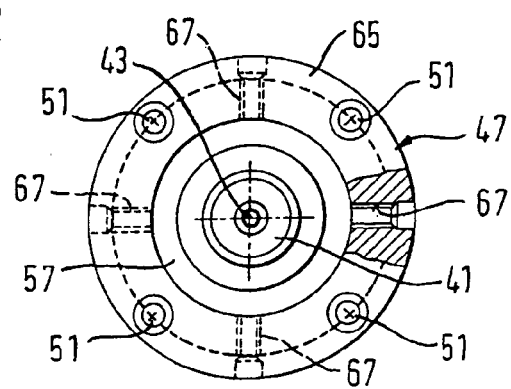

An exemplary embodiment of the invention is explained in more detail below with reference to a drawing in which:

FIG. 1 shows an axial longitudinal section through a tracer-type measuring instrument with a centering holder according to the invention, and FIG. 2 shows an axial view of the centering holder.

The tracer-type measuring instrument, designated in general by 1 in FIG. 1, comprises a housing 3, on which a tracing lever, designated in general by 5, is guided displaceably in the direction of a measuring axis 7 defined by the housing 3. Furthermore, the tracing lever 5 is guided on the housing 3, pivotably on all sides about a pivot point 11 lying on the measuring axis 7, by means of a universal joint, here in the form of a ball joint 9, and is prestressed resiliently by a restoring spring 13 into the position of rest illustrated in the drawing, in a way which is also explained in more detail below. The tracing lever 5 has a tracing arm 15 which projects out of the housing and of which the free tracing end 17 formed by a ball defines a tracing reference point 19 lying on the measuring axis 7 in the position of rest of the tracing lever 5. In relation to the pivot point 11, a coupling arm 21 of the tracing lever 5 projects, opposite to the tracing arm 15, into a circular-cylindrical guide orifice 23 of the housing 3, said guide orifice being centric to the measuring axis 7. An essentially sleeve-shaped coupling piece 25 is guided in the guide orifice 23 displaceably in the direction of the measuring axis 7 by means of a guide sleeve 27, for example a spherical guide bush of the type explained in DE-A-100 14 630. A digital path-measuring device 29 held on the housing 3 detects the position of the coupling piece 25 in relation to the housing 3 by means of a digital path sensor 31 and indicates on a display 33 the value of the deflection in relation to the position of rest, illustrated in FIG. 1, of the tracing lever 5. A mechanical length-measuring dial gauge may also be provided instead of the digital path-measuring device 29.

The coupling piece 25 has, in the region of its end axially remote from the pivot point 11, an inner control surface 35 in the form of a frustoconical surface with a rectilinear generatrix, with which it bears against a convex outer control surface 37, formed at the free end of the coupling arm 21, of the tracing lever 5. The inner control surface 35 is rotationally symmetrical to the measuring axis 7, while the outer control surface 37 is rotationally symmetrical to the straight line through the tracing reference point 19 and the pivot point 11, said straight line coinciding with the measuring axis 7 in the position of rest of the tracing lever 5. The outer control surface 37 has a generatrix in the form of a segment of a circle. The restoring spring 13 prestresses the coupling piece 25 in the direction of the tracing end 17 and at the same time ensures a bearing contact pressure of the control surfaces 35, 37 bearing against one another.

During operation, the tracer-type measuring instrument 1 is held in a machine tool or a measuring instrument or the like by means of a standard coupling, for example a steep-angle taper shank, indicated at 39, which is coaxial to the measuring axis 7. During an adjusting movement of the tracing end 17 in the direction of the measuring axis 7 which occurs during measuring operation, the coupling arm 21 drives the coupling piece 25 which, in turn, adjusts the path-measuring device 29. During an adjusting movement of the tracing end 17 transversely to the measuring axis 7, the coupling arm 21 pivots about the pivot point 11 defined by the ball joint 9. The control surfaces 35, 37, which slide on one another along their generatrices during this pivoting movement of the coupling arm 21, convert the pivoting movement of the tracing lever 5 to an axial movement of the sleeve-shaped coupling piece 25, in such a way that the path-measuring device 29 measures the radial distance between the tracing reference point 19 and the measuring axis 7. For further details of a tracer-type measuring instrument of this type, reference is made to DE-A-100 14 630.

The tracer-type measuring instrument 1 is provided with a carrying shank 41, by means of which it can be clamped into the standard coupling 39 or into another tool holder of the machine tool. For exact measurements, it is necessary that the measuring axis 7 defined by the housing 3 or the tracing lever 5 runs coaxially to a centric shank axis 43 defined by the carrying shank 41. So that radial errors of alignment can be compensated, the housing 3 is held on the carrying shank 41 via a centering holder 45. The centering holder 45 allows axially parallel adjustment of the measuring axis 7 in relation to the shank axis 43. For this purpose, the centering holder 45 comprises a radially projecting connecting flange 47 which is integrally formed in one piece on the carrying shank 41 and which is screwed to an axially perpendicular fitting surface 49 with the aid of a plurality of axial screws 51. The connecting flange 47 forms, toward tracing end 17, a centering extension 53, by means of which said connecting flange is guided with a close radial fit in the guide orifice 23.

On sides located axially opposite one another, the connecting flange 47 is provided with annular grooves 55, 57 which are concentric to the shank axis 43 and which overlap one another in the axial direction and between them delimit a circular-cylindrical axially parallel straight sleeve portion 59. An annular portion 61 formed by the bottom of the radially inner annular groove 55 connects that axial end of the sleeve portion 59 which faces away from the tracing end 17 to the carrying shank 41, while the axially other end of the sleeve portion 59 is connected, by means of an annular portion formed by the bottom 63 of the outer annular groove 57, to the circumferential region 65 of the connecting flange 47, said circumferential region being screwed to the housing 3.

In at least three, here four, radial threaded holes 67 arranged distributed in the circumferential direction, are seated setscrews 69 which are accessible radially from outside and which are supported with their inner ends, near the end facing axially away from the tracing end 17, on the sleeve portion 59 and consequently, in the region of the annular portion 61, on the latter.

The sleeve portion 59 forms a parallelogram guide which can be deflected on all sides transversely to the shank axis 43 and in which the sleeve portion 59 subjected to flexurally elastic stress forms a parallelogram link deflectable on all sides. By the setscrews 69 being adjusted, the carrying shank 41 is displaced parallel to the measuring axis 7, the setscrews 69 at the same time assuming the function of operational fixing. Since four setscrews 69 offset to one another in each case at 90° are provided, the setscrews can be locked in pairs.

In the exemplary embodiment illustrated, the parallelogram guide is implemented by an annularly closed sleeve extension. Instead of the annularly closed sleeve extension, a sleeve extension segmented in the circumferential direction may also be provided, or else the sleeve extension is formed by a cage comprising axially running bars. In a further variant, the connecting flange 47 may not only be connected in one piece to the carrying shank 41, but also to the housing 3. In particular, the last-mentioned variant is suitable for other applications of the centering holder 45, for example for applications in which the component corresponding to the housing 3 forms a sleeve portion for the shrink-fit holding of a tool shank of a rotary tool, as is customary in the case of toolholders which, for example, are thermally expandable inductively. The carrying shank may then be designed directly as a standard coupling similar to the standard coupling 39.

The invention claimed is:

1. A centering device, in particular for a tracer-type measuring instrument, comprising:
   a) an instrument carrier defining an instrument axis;
   b) a carrying shank defining a shank axis;
   c) a centering holder holding the instrument carrier, with the instrument axis parallel to the shank axis, radially movably to the latter, but so as to be capable of being fixed to the carrying shank, wherein the centering holder is designed as a parallelogram guide with a parallelogram-link region, or a plurality of these regions, distributed about the shank axis and the instrument axis and extending along these axes.

2. The centering device as claimed in claim 1, wherein the parallelogram-link region is formed by a circular-cylindrical sleeve portion axially parallel to the shank axis and to the instrument axis.

3. The centering device as claimed in claim 2, wherein the sleeve portion is designed with a closed wall in the circumferential direction.

4. The centering device as claimed in claim 2, wherein the centering holder comprises a connecting flange which surrounds the shank axis and the instrument axis and connects the carrying shank to the instrument carrier and which has, on its sides facing axially away from one another, annular grooves which are concentric to one another, overlap one another axially and delimit the sleeve portion radially between them.

5. The centering device as claimed in claim 1, wherein the parallelogram-link region is connected at its one axial end to a first annular portion of the centering holder and at its other axial end to a second annular portion of the centering holder, and in that one of these annular portions carries at least one setscrew which is supported radially in the region of the other of these annular portions.

6. The centering device as claimed in claim 5, wherein one annular portion carries at least three setscrews distributed in the circumferential direction.

7. The centering device as claimed in claim 5, wherein the two annular portions are arranged coaxially one in the other, and the outer annular portion carries the at least one setscrew in a radially screwable manner.

8. The centering device as claimed in claim 1, wherein the parallelogram-link region is produced with its axial ends integrally in one piece with at least one of the carrying shank and the instrument carrier.

* * * * *